(12) United States Patent
Schatzberg et al.

(10) Patent No.: US 9,037,408 B2
(45) Date of Patent: May 19, 2015

(54) SYSTEMS AND METHODS FOR PROVIDING VARIABLE POSITION PRECISION

(75) Inventors: Uri Schatzberg, Kiryat Ono (IL); Yuval Amizur, Kfar-Saba (IL); Leor Banin, Petach Tikva (IL); Jonathan Segev, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 13/536,398

(22) Filed: Jun. 28, 2012

(65) Prior Publication Data
US 2014/0005939 A1 Jan. 2, 2014

(51) Int. Cl.
| | | |
|---|---|---|
| *G01C 21/00* | (2006.01) | |
| *G01C 21/20* | (2006.01) | |
| *H04W 4/04* | (2009.01) | |
| *H04L 29/08* | (2006.01) | |
| *G01S 19/48* | (2010.01) | |
| *G01S 5/02* | (2010.01) | |

(52) U.S. Cl.
CPC .............. *G01C 21/20* (2013.01); *H04W 4/04* (2013.01); *H04L 67/18* (2013.01); *G01S 19/48* (2013.01); *G01S 5/0263* (2013.01)

(58) Field of Classification Search
None
See application file for complete search history.

(56) References Cited

U.S. PATENT DOCUMENTS

| | | | |
|---|---|---|---|
| 5,519,618 A * | 5/1996 | Kastner et al. | 701/120 |
| 8,626,191 B2 * | 1/2014 | Siomina et al. | 455/456.1 |
| 2008/0068261 A1 * | 3/2008 | Hempel | 342/357.06 |
| 2013/0237244 A1 * | 9/2013 | Siomina et al. | 455/456.1 |

* cited by examiner

*Primary Examiner* — Thomas Tarcza
*Assistant Examiner* — Adam Alharbi
(74) *Attorney, Agent, or Firm* — Sutherland Asbill & Brennan LLP

(57) ABSTRACT

Systems and methods that provide positional data with a variable level of precision may be implemented on positional systems of electronic devices by associating a position profile to application software running on the electronic devices.

28 Claims, 4 Drawing Sheets

SYSTEMS AND METHODS FOR PROVIDING VARIABLE POSITION PRECISION

FIELD OF THE DISCLOSURE

The present disclosure relates to systems and methods for providing position information, and more particularly variable levels of position precision.

BACKGROUND OF THE DISCLOSURE

Navigation and/or position systems, such as satellite position systems, are commonly used to determine a location of the user. One example of a position system uses a global navigation satellite system (GNSS), such as the Global Positioning System (GPS), and receives satellite signals broadcast from multiple satellites. Position systems often include receivers carried by, for example, a user or a vehicle as the user or vehicle moves. Such position system receivers may receive navigation signals from satellites, wireless fidelity (Wi-Fi) access points (APs), and inertial sensors; process the navigation signals to obtain navigation data, such as estimated position of the receiver; and provide the navigation data, navigation data log, or navigation instruction based on the navigation data to the user.

These navigation and/or position systems may be incorporated in electronic devices, such as those incorporated into smart phones, tablet computers, or the like. The location information generated by the position systems may be used by any variety of applications and/or software running on electronic devices. For example, one or more applications may provide points of interest, such as hotels, museums, or restaurants near a user based at least in part on the user's location as ascertained by a position system on the user's mobile device. The application may in certain instances communicate the user's position to a remote entity, such as a remote server.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
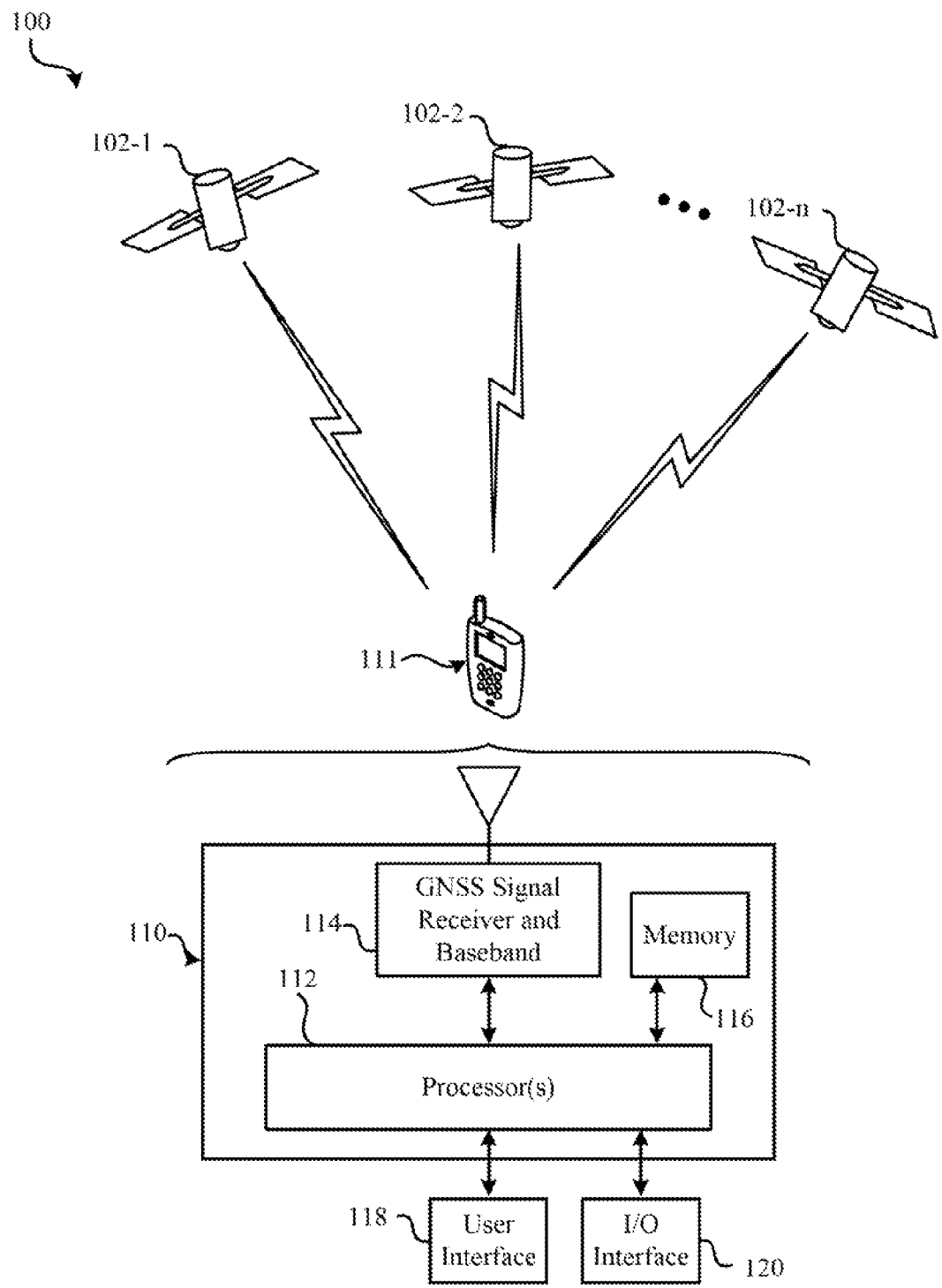
FIG. 1 is a simplified schematic diagram illustrating an example satellite-based position system that can be operated in accordance with illustrative embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Generally, the applications executed on electronic devices that use user location information are provided with a fixed user location precision. Typically, the precision of the user location that is provided to the applications running on the electronic device is the highest precision that the position system is capable of on the electronic device. Therefore, third-party entities may be provided with relatively accurate and precise locations of the user. In many cases, the user may not be aware of all of the parties that have access to this relatively accurate and precise location information. Additionally, the third-party entities may not follow that procedures and/or practices for securing the user's known position.

Embodiments of the disclosure may provide systems and methods for providing variable precision and/or variable accuracy location information to application software running on electronic systems. In one aspect, the systems and methods disclosed herein may associate a position profile with a respective corresponding application software that is executed on a electronic system. The association of the position profile may be performed when a particular application software requests position information from an operating system and/or an application framework provided on the electronic system. In another aspect, when an application software requests location information from a position engine of the electronic system, the precision of the location information provided to the application software may be based at least in part on the position profile associated with that application software. Therefore, there may be a setup stage where application software and programs are associated with the respective corresponding location profile, and there may be a second stage where the application software requests position information and is provided that position information based on the location profile that has been allocated to that application software. In one aspect, the location profile associated with a particular application software or program may be based at least in part on the positional precision requirements of that particular application software or program.

The systems and methods disclosed herein may further include an operating system and/or an application framework that receives a request for position information from an application software and/or program. The request for position information may further include an indication of an associated position profile. The operating system and/or application framework may determine, based at least in part on the indication of an associated position profile, the precision and/or the accuracy of location and/or position information to be provided to the requesting application software and/or program.

In certain embodiments, positional information may be provided as a numerical coordinate on a coordinate system. In these embodiments, the positional information provided to a particular application software and/or program may be degraded in positional precision by adding and/or subtracting an spatial offset level. The spatial offset level may be set within a predetermined maximum offset amount. For example, degraded positional coordinates may be within +/−100 m of the accurate and precise position. In these embodiments, while the spatial offset level that may be used to provide degraded positional coordinates may be randomly generated based at least in part on the desired precession level, the spatial offset may be maintained at a fixed level for a predetermined period of time. In other words, the spatial offset used to decrease the precision of the position coordinates may not be randomly determined every time an application and/or service requests position information. Indeed, random variation of the offset level for each position request may enable the position requesting application software and/or program to perform computations on multiple positional coordinates to determine the location of the electronic system with a precision that is greater than was intended by the user and/or the electronic system. Therefore, by using nonrandom variations of the offset level during a predetermined period of time, the application software and/or program may not be able to determine position information with greater accuracy using multiple positional information provided by the position engine.

In certain other embodiments, positional information may be provided as geographical information. For example the position requesting application software and/or program may receive positional information indicated as a street position, a neighborhood, a zip code, a country, or the like. In this case, the position engine, the operating system, and/or the application framework may have access to a database to translate a particular position provided by the position engine into geographical information. Furthermore, the granularity and/or the precision of the geographical information will be based on the position profile associated with the particular application software and/or program requesting position information.

Referring now to FIG. 1, a variable precision and position determination may be made with a position system 110 used in a global navigation satellite system (GNSS) 100 in accordance with embodiments of the disclosure. The GNSS 100 may be any one of known current GNSS or planned GNSS, such as the Global Positioning System (GPS), the GLONASS System, the Compass Position System, the Galileo System, or the Indian Regional Navigational System. The GNSS 100 can include a plurality of satellites 102-1 to 102-n broadcasting radio frequency (RF) signals including satellite transmission time and position information. The satellite RF signals received from three or more satellites 102-1 to 102-n may be used by the position system 110 to obtain navigation data using a known GNSS or GPS signal and data processing techniques, as described in greater detail below. Although only three satellites 102-1 to 102-n are shown for purposes of simplicity, the GNSS 100 may include many more satellites (e.g., 24 GPS satellites) orbiting the earth, for example, in a low earth orbit (LEO) to allow broad coverage.

An embodiment of the position system 110 can receive satellite signals from the three or more satellites 102-1 to 102-n and can process the satellite signals to obtain satellite transmission time. The position system 110 can process the satellite time data to obtain measurement data representative of measurements relative to the respective satellites 102-1 to 102-n and can process the measurement data to obtain navigation information representative of at least an estimated current position of the position system 110. In one embodiment, the measurement data can include time delay data and/or range data, and the navigation information can include one or more of position, velocity, acceleration, and time for the position system 110.

While FIG. 1 depicts the navigation signal source as GNSS from satellites 102-1 to 102-n, the navigation signal with location and/or time information may be obtained from any suitable source including, but not limited to, Wi-Fi APs, inertial navigation sensors, or combinations thereof. The inertial navigation sensors may include, for example, accelerometers or gyros, such as micro-electromechanical systems (MEMS) based accelerometers. For illustrative purposes, the remainder of the disclosure will depict the navigation signal source as GNSS from satellites, but it will be appreciated that embodiments of the disclosure may be implemented utilizing any suitable source of navigation signal. In certain embodiments, multiple sources of navigation signals may be utilized by the systems and methods described herein.

The position system 110 may, in certain embodiments, be implemented in a electronic system 111 that can execute instructions and/or programs that may use navigation information, such as position information, to provide one or more services to a user of the electronic system 111. In some embodiments, the electronic system 111 may display the navigation data or use the navigation data and, in particular, the position data to enable certain services to the user of the electronic system 111. In certain embodiments, the position system 110 may provide position information with a variable level of precision to services provided by the electronic system 111. The electronic system 111 may include any suitable electronic system or system such as, for example, a mobile phone, a smart phone, a watch, a tablet computer, a laptop computer, a personal digital assistant (PDA), a personal computer (PC), or the like. While the position system 110 is described herein in the context of a mobile electronic system, it will be appreciated that the systems and methods described herein may be applied to any electronic system, including stationary electronic systems.

The position system 110 may also adjust or change one or more precision and/or accuracy settings in the position system 110 in response to one or more characteristics associated with the services and/or applications operating on the electronic system 111 requesting position and/or other navigation information from the position system. In particular, the position system 110, and the hardware and software associated therewith, may be configured to provide position information to a particular application and/or service at one of two or more precision and/or accuracy levels. In certain embodiments, the precision level may be set according to the service provided by the electronic system 111 and/or the instructions, applications, or software running on the electronic system 111.

With continuing reference to FIG. 1, the electronic system 111 and the position system 110 may include one or more processors 112 coupled to a front end GNSS signal receiver and baseband 114 and coupled to a memory 116. The GNSS signal receiver and baseband 114 may be configured to receive, sample, and process the satellite signals to obtain the time and position information from the satellite signals. The processor(s) 112 may be configured to handle data processing to obtain the measurement data and determine the position information therefrom. The memory 116 may store the instructions and data for processing while the processor(s) 112 execute the instructions to process the data. The memory 116 may store, for example, data and instructions that may be executed by the processors 112 to determine position information from the received navigation signals.

As depicted herein, the processors 112 may also be configured to operate instructions, applications, and/or software associated with services provided by the electronic system 111. Therefore the processing resources, in the form of at least the processors 112, may be used by the electronic system 111 for both position determination and for executing other instructions associated with other position and/or navigation related and/or non-position related applications. Similar to the processors 112, the memory 116 may also be a resource that may be used for storing instructions and/or data utilized for position determination and for other instructions, applications, and/or software executed by the processors 112. Some instructions, applications, and/or software executed by the processors 112 and/or stored in the memory 116 may make use of position information determined by the processors 112. The applications and/or software that may be executed on the processors 112 may include navigation applications, position-based information applications, position-based mapping applications, points-of-interest applications, position-based authorization and/or verification applications, or the like. For example, an application executed on the processors 112 may utilize position information to determine if a particular user of the electronic system 111 is in a location where he/she may access a particular online account or service. As another example, an application executed on the processors 112 may utilize position information to provide information associated with restaurants, or other points-of-interest, that may be in the relative vicinity of the electronic system 111. As yet another example, an application executed on the processors 112 may provide coupons, advertisements, or other commercial incentives associated with product or service providers in the relative vicinity of the electronic system 111. While the processors 112 are depicted as both providing position determination related processing and processing for executing application software, it will be appreciated that the position related processing and the application software related processing may be conducted by two or more separate sets of processors under certain embodiments of the disclosure.

The processor(s) 112 may include, without limitation, a central processing unit (CPU), a digital signal processor (DSP), a reduced instruction set computer (RISC), a complex instruction set computer (CISC), or any combination thereof. The position system 110 may also include a chipset (not shown) for controlling communications between the processor(s) 112 and one or more of the other components of the position system 110. In one embodiment, the position system 110 may be based on an Intel® Architecture system, and the processor(s) 112 and the chipset may be from a family of Intel® processors and chipsets, such as the Intel® Atom® processor family. The processor(s) 112 may also include one or more processors as part of one or more application-specific integrated circuits (ASICs) or application-specific standard products (ASSPs) for handling specific data processing functions or tasks.

The GNSS signal receiver and baseband 114 may be of any known type. While any known GNSS signal receiver and baseband 114 may be suitable, one example implementation may include one or more antennas, a low noise amplifier (LNA), additional signal amplifiers, an analog-to-digital (A/D) converter, one or more buffers, and a digital baseband. In particular, the GNSS signal receiver and baseband 114 may receive a scheduling control signal to control the sampling rate of the satellite signal receiver and baseband 114. It will be appreciated that in embodiments where position and/or navigation signals are derived from non-GNSS sources, the position system 110 may include a signal receiver suited to receive those position and/or navigation signals. For example, if the position system 110 is configured to determine position information based on Wi-Fi APs then the position system may include a Wi-Fi receiver. As another example, if the position system 110 is configured to determine position from inertial sensors, then the position system 110 may include one or more sensors configured to provide appropriate position and/or navigation signals to the processors 112 of the position system 110 and the electronic system 111.

The memory 116 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The position system 110 and the electronic system 111 may also include a user interface 118 and an input/output (I/O) interface 120. The user interface 118 may include, for example, one or more keys and a display, a touchscreen, a haptic interface, a vibration generator, a microphone, a speaker, an image sensor, an accelerometer, or other hardware and/or software elements capable of providing input from a user and output to a user. The I/O interface 120 may include, for example, a wireless interface for connecting to a wireless network or device (e.g., using Wi-Fi or Bluetooth protocols) or a wired interface for connecting to a network or device (e.g., using a USB connection and protocol).

Although the electronic system 111 is shown as a handheld unit, a position system receiver with location-aware accuracy adjustment may take other forms. For example, a position system receiver with location-aware accuracy adjustment may be worn by a user or may be carried by a vehicle. The GNSS signal receiver and baseband 114 may also be provided as a separate GNSS signal receiver unit, which may be connected to a separate processing unit such as, for example, a general purpose computer programmed to perform the data processing functions.

Figure 2:
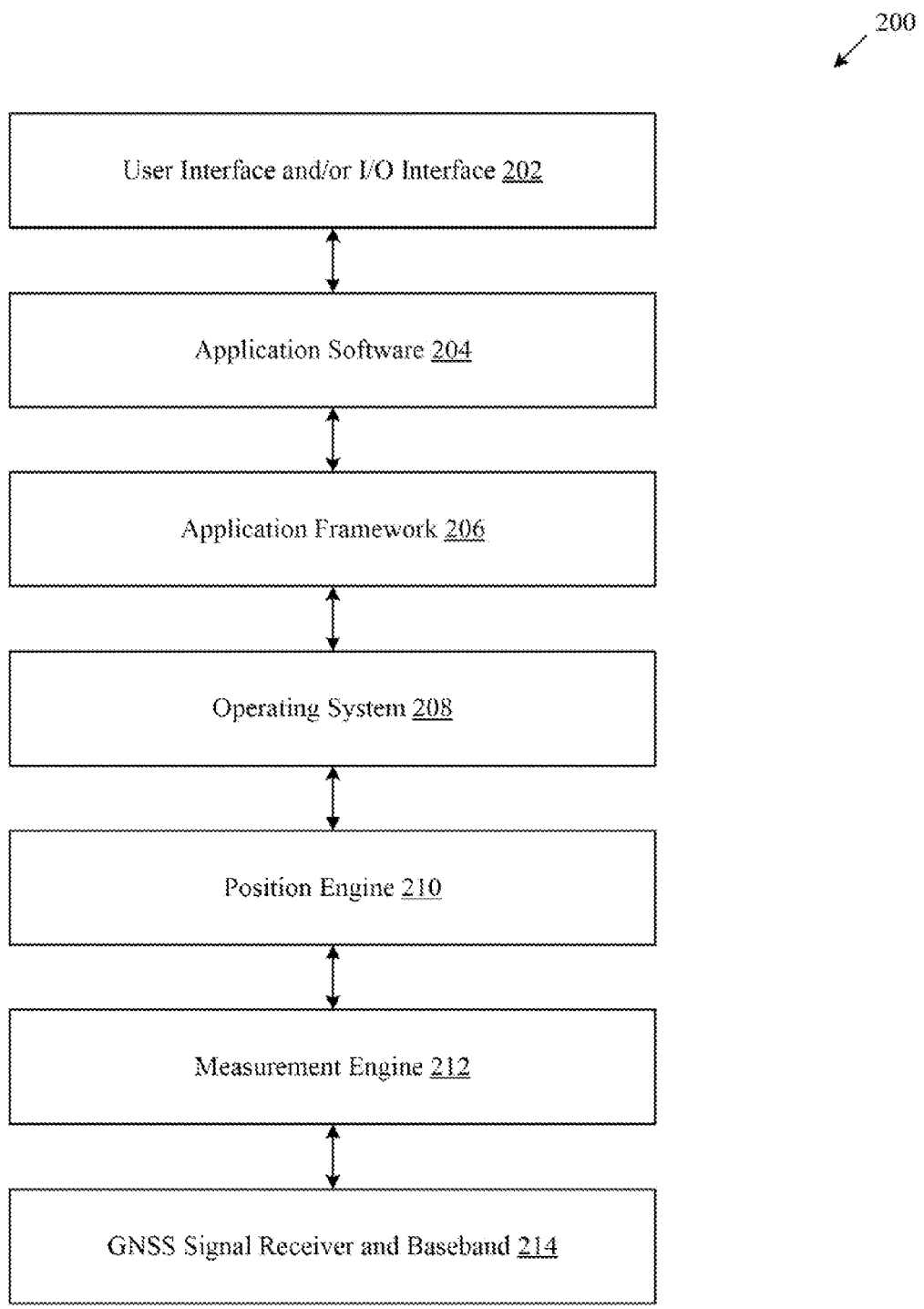
FIG. 2 is a simplified block diagram illustrating elements of the example position system of FIG. 1 that can be operated in accordance with illustrative embodiments of the disclosure.

Referring now to FIG. 2, an example block diagram of the electronic system 200, in accordance with embodiments of the disclosure, is depicted. In certain aspects, the example electronic system 200 may be an abstracted view of the example electronic system 111 as depicted in FIG. 1. In other words, the elements of the electronic system Ill of FIG. 1, including the processors 112 and the memory 116, and the applications and/or software executed and/or stored thereon, may provide the functional blocks of the electronic system 200 as depicted in FIG. 2.

The electronic system 200 may include a user interface and/or I/O interface 202 that may be communicatively coupled to, utilized by, and/or controlled by one or more application software 204. In one aspect, the user interface and/or I/O interface 202 may be similar to the user interface 118 and/or the I/O interface 120 as described in reference to FIG. 1 and, in the interest of brevity, will not be repeated here. The application software 204 may be any variety of instructions, applications, firmware, and/or software that may be stored on the memory 116 and executed by the processors 112. As discussed above, the one or more application software 204 may be configured to request and/or receive position and/or navigation related information from one or more elements of the electronic system 200. In certain embodiments, each of the one or more application software 204 may be configured to have a position profile associated therewith. Each of the application software 204 may further be configured to receive positional information based at least in part on the position profile associated therewith. In certain cases, the application software 204 may be configured to communicate information, including positional information, to entities remote to the electronic system. For example, the application software 204 may use the user interface and/or I/O interface 202 to communicate received positional information to an external server (not shown) using any variety of networks and/or protocols. In certain aspects, the user and/or owner of the electronic system may not be aware of the external entities that may receive position information associated with the electronic system 200 and/or the user. In some cases, when position information is communicated to third parties, the user of the electronic system may lose his/her ability to control the distribution of the positional information.

In certain aspects, the application software 204 may be any known application that can receive and use position and/or navigation information such as position information. As a non-limiting example, the application software 204 may include a navigation tool that displays the current estimated position based on the navigation information received from other elements of the electronic system 200. In some cases, the position may be overlaid on a map grid. The navigation tool may further provide, the functionality of snapping the current location to a road on the map. Alternatively, the navigation tool may snap to a shipping route, a flight route, or any other predetermined pathways that may be available to the electronic system. Additionally, the navigation tool may generate and provide a navigation route to travel from the estimated current position to a destination position that is identified by a user of the electronic system 200. The maps and map grids may include at least one of cartographic or geographic data. The map and map grids used by the navigation tool may further be stored on the memory 116. The route, map, and current estimated location may be displayed by the navigation tool on the user interface 118, such as a touch screen. Therefore, the application software 204 may provide navigation capability for walking, for vehicles, for aircraft, for boats, and other forms of transportation. This particular application software, and associated services, may require position information with a relatively high degree of precision, such as on the order of 10 s of meters or more precise.

Another non-limiting example of an application software 204 may be a social networking application that receives location information from the position system 110 and provides and/or enables postings on a social networking website of the current location of the user of the position system 110. The application software 204 in the form of a social networking application may further locate points of interest in proximity of the estimated current position and use such information to allow the user of the position system 110 to select his/her exact location as one of the relatively proximate points of interest. Information about points of interest may be stored on the memory 116 or received from the worldwide web (WWW) via I/O interface 120. Therefore, the application software 204 may provide various forms of geo-tagging capability. These types of application software 204, and associated services, may require a relatively medium level of positional precision, such as on the order of 100 s of meters, few kilometers, and/or neighborhood level precision.

In yet another non-limiting example, an application software 204 may use location or position information to determine if the user of the electronic system 200 is located in a particular country or state, where the application software 204 may offer certain services. For example, an application software 204 may only provide certain media streaming services in a particular country to comply with copyright laws or contractual terms associated with the entity offering such streaming services. Additionally, location information may be determined to assess if certain services may be offered in certain locations and/or are lawful in those areas. For example, a gambling related application software 204 may determine if the user of the mobile device 200 is located in the state of Nevada, where gambling may be legal, and not in the neighboring states of California, Arizona, Utah, Idaho, or Oregon, where gambling may be unlawful or restricted, before offering such gambling service to the user. These types of application software, and associated services, may require a relatively low level of precision, such as on the order of 10 s of kilometers, or even geographical position information, such as an indication of the country, state, county, city, or the like.

Without providing an exhaustive set of example application software 204, it can be appreciated that these application software 204 can use position information for various forms of entertainment, gaming, documentation, geo-tagging, verification, authentication, scientific applications, various forms of navigation, safety monitoring of transportation vehicles, monitoring of migratory patterns of animals, and the like.

The electronic system may further include an application framework 206. In certain aspects, the application framework 206 may provide an application program interface (API) to the one or more application software 204. In other words, the application framework 206 may provide a uniform interface to a variety of application software 204 that may interface with the application framework 206. In some cases, the uniform interface may be used by developers to more easily and/or rapidly develop and deploy application software 204. The application framework 206 may be implemented as software, hardware, or a combination thereof. In certain embodiments, the application framework 206 may be configured to associate at least one position profile corresponding to a respective application software 204. In some cases, the application framework 206 may associate a particular position profile to a particular application software 204 based at lest in part on user input. The application framework 206 may further provide position information to the application software 204. The position information provided to the application software 204 may be based on the position profile associated with that application. Therefore, in certain embodiments, the application framework 206 may be configured to receive a request for position information from a particular application software 204 along with a position profile associated with the application software 204.

The application framework 206 may further be configured to provide positional information to the application software 204 based at least in part on the associated position profile. In this case, the positional information may be associated with the position of the electronic system. In other words, the positional information may, in certain embodiments, be a degraded or less spatially precise information determined from the position information. Therefore, the position information may be at a relatively high level of precision, such as at or near the precision limits of the electronic system 200, and the positional information may be a less precise numerical derivation of the position information.

Indeed, the application framework 206, and the algorithms associated therewith, may receive position information with a relatively high level of spatial precision, such as at the position precision limits of the electronic system 200 and then degrade the precision of the received position information. In this case, the application framework 206 may employ any variety of numerical techniques to generate the positional information by reducing and/or otherwise changing the precision of the position information received by the application framework 206. For example, one such numerical technique may include adding a spatial offset to the received position information to generate the relatively lower precision positional information.

In certain embodiments, the application framework 206 may reduce the precision of the positional information provided to the application software 204 in accordance with the position profile associated with the particular application software 204. Indeed, the application framework 206 may provide a first positional information to a first application software 204 with a first positional precision and a second positional information to a second application software 204 with a second positional precision. In some embodiments, the first and second positional precision may be different from each other. In other embodiments, the first and second positional precision may be the same.

In one non-limiting example, there may be a choice of five profiles and, therefore, five respective corresponding positional precision levels. These positional precision levels may be: Profile 1: precision limit of the electronic system; Profile 2: +/−100 m precision; Profile 3: +/−1 km precision; Profile 4: +/−10 km precision; Profile 5: +/−100 km precision. Continuing with this example, there may be a first application software, such as a navigation software, that has Profile 1 associated therewith and, therefore, the application framework 206, during operation, may provide the first application software with the greatest relative level of precision, such as precision that is limited by the capabilities of the electronic system 200 and the position system 110 operating thereon. At the same time, a second application software may have profile 3 associated therewith and, therefore, during operation, application framework 206 may provide the second application software with positional information with a precision of +/−1 km.

In the embodiments where a spatial offset may be added to the received position by application framework 206, the amount of the spatial offset may be fixed for a predetermined length of time. In other words, the spatial offset may be randomly or near-randomly generated at the expiration of a predetermined period of time, but may remain fixed during the span of the predetermined period of time. As such, if an application software 204 requests a position multiple times within that predetermined length of time, then the application software 204 may receive the same results each time, rather than randomly offset positional results. Therefore, the offset may be the same for all of the positional information provided to the application software 204 during the time corresponding to the predetermined period of time, and the spatial offset may, furthermore, be unknown to the application software 204. In one non-limiting example, the predetermined time period may be in the range of approximately 15 minutes to approximately 5 hours. In another non-limiting example, the predetermined time period may be approximately 3 hours. It will be appreciated that by holding a particular spatial offset for a predetermined period of time, it may be more difficult for an entity, including the application software 204 and/or a remote server with which the application software 204 communicates, to use mathematical or statistical techniques to derive a positional precision that is greater than what that application software 204 is provided according to its associated position profile. For example, if the offset used by the application framework 206 was randomly generated each time a position was requested, then an application software 204 may request and receive multiple positional information and calculate an average of those multiple positional information to determine position information that is of a higher level of precision than what the application software 204 is provided with any single positional information point.

In certain embodiments, the spatial offset for all available position profiles may be changed contemporaneously. In other embodiments, the spatial offset associated with each position profile may be changed at different times. It will be appreciated that if a particular entity, such as a third-party service provider, has access to positional information from more than one application software 204 from a particular electronic system 200, then that entity may be able to ascertain the position of the electronic system 200 with a precision greater than the precision allowed by any of the application software 204 with which the entity communicates.

In certain embodiments, the application framework 206 may be configured to provide positional information in the form of geographic position information, such as an indication of a street address, street only, neighborhood, zip code, area code, city, state, country, continent, or the like. The application framework 206 may, in this case, be configured to receive a request for positional information from a particular application software 204. The application framework 206 may further be configured to request and/or receive position information of the electronic system 200. Upon receiving the position information, the application framework 206 may determine geographic position information based at least in part on the position profile associated with the positional information requesting application software 204. In one aspect, the application framework 206 may access a database and/or a look-up table that maps location coordinates to geographic information. This database and/or look-up table, in certain embodiments, may be stored in the memory 116. In other embodiments, the database and/or look-up table may be accessed over a network via the user interface and/or I/O interface 202 of the electronic system 200.

The electronic system 200 may further include an operating system 208 that may be configured to enable the operation of the one or more application software 204 and/or the application framework 206. In one aspect, the operating system 208 may provide for a common interface for the application software 204 and the application framework 206 of the electronic system 200 to interface with, utilize, and/or control the various hardware elements of the electronic systems. The particulars of operating systems are well-known and will not be discussed in significant detail herein. Example operating systems may include, but are not limited to, Google® Android®, Apple® iOS®, Microsoft® Windows Mobile®, Microsoft® Windows 7®, or the like. In certain aspects, such as in the context of providing location information to an application software 204, the operating system 208 may be referred to as a location manager. In certain embodiments, the operating system 208 may provide location- or position-based services to the application software 204 and/or the application framework 206.

Still referring to FIG. 2, the electronic system 200 may further include a position engine 210 that may be configured to receive pseudo-range data from a measurement engine 212 that may, in turn, determine pseudo-range data from a GNSS signal receiver and baseband 214. The combination of the position engine 210, the measurement engine 212, and the GNSS signal receiver and baseband 214 may provide position information to the operating system 208 and/or directly to the application framework 206. The measurement engine 212, often referred to as a tracker, may calculate delay measurements using the transmission time obtained from the satellite signals and the reception time at the GNSS signal receiver and baseband 214. The delay measurements may be used by the measurement engine 212 to calculate range measurements such as, for example, pseudo-range measurements. Pseudo-range generally refers to a range calculation from the electronic system 111 to a satellite, such as satellite 102-1-n. Pseudo-ranges may be calculated by the measurement engine 212 to each satellite 102-1-n from which a satellite signal is received. In one aspect, a pseudo-range can be determined by multiplying the delay measurements of each of the satellites 102-1-n from which signals are received by the speed of light. The position engine 210, often referred to as a navigator, may receive the pseudo-range measurements from the measurement engine 212 and determine navigation information from the same. Therefore, the position engine 210 may perform various mathematical manipulations of the pseudo-range data corresponding to one or more satellites 102-1-n, such as triangulation, to provide position information. For example, the position engine 210 may perform triangulation using three different pseudo-ranges to provide two-dimensional position information, such as latitudinal and longitudinal coordinates. As a further example, the position engine 210 may perform triangulation using four different pseudo-ranges to provide three-dimensional position information, such as latitudinal, longitudinal, and altitudinal coordinates. Therefore, the position engine 210 may be responsible for processing the measurement data to obtain position, velocity, and/or time (PVT) data representative of an estimated position, velocity, and time of the electronic system 200. In other words, the position engine 210 may calculate an estimated position of the electronic system 200 using the satellite position information and the pseudo-range measurements for three or more satellites. Four or more satellites may be used to calculate an estimated position with three position dimensions (X, Y, Z) and time, although three satellites may be used to calculate the estimated position with two dimensions (X,Y). The estimated position may be converted to and represented using known World Geodetic System (WGS) coordinates (e.g., WGS 84).

As discussed above, in some embodiments, location and/or position information may be derived from signals other than GNSS signals. For some of those embodiments, it will be appreciated that hardware and/or software implementations other than the GNSS signal receiver and baseband 214, the measurement engine 212, and/or the position engine 210 may be used to provide the operating system 208 and/or the application framework 206 with position information associated with the electronic system 200.

Although described with a particular hardware and software configuration, the functional elements in FIG. 2 may be implemented using any suitable combination of hardware and software. In some embodiments, for example, one or more of the functional elements, or portions of the functional elements, may be implemented using one or more general purpose processors executing software instructions. In other embodiments, one or more of the functional elements, or portions of the functional elements, may be implemented using one or more ASICs or ASSPs designed specifically to perform the functions.

Figure 3:
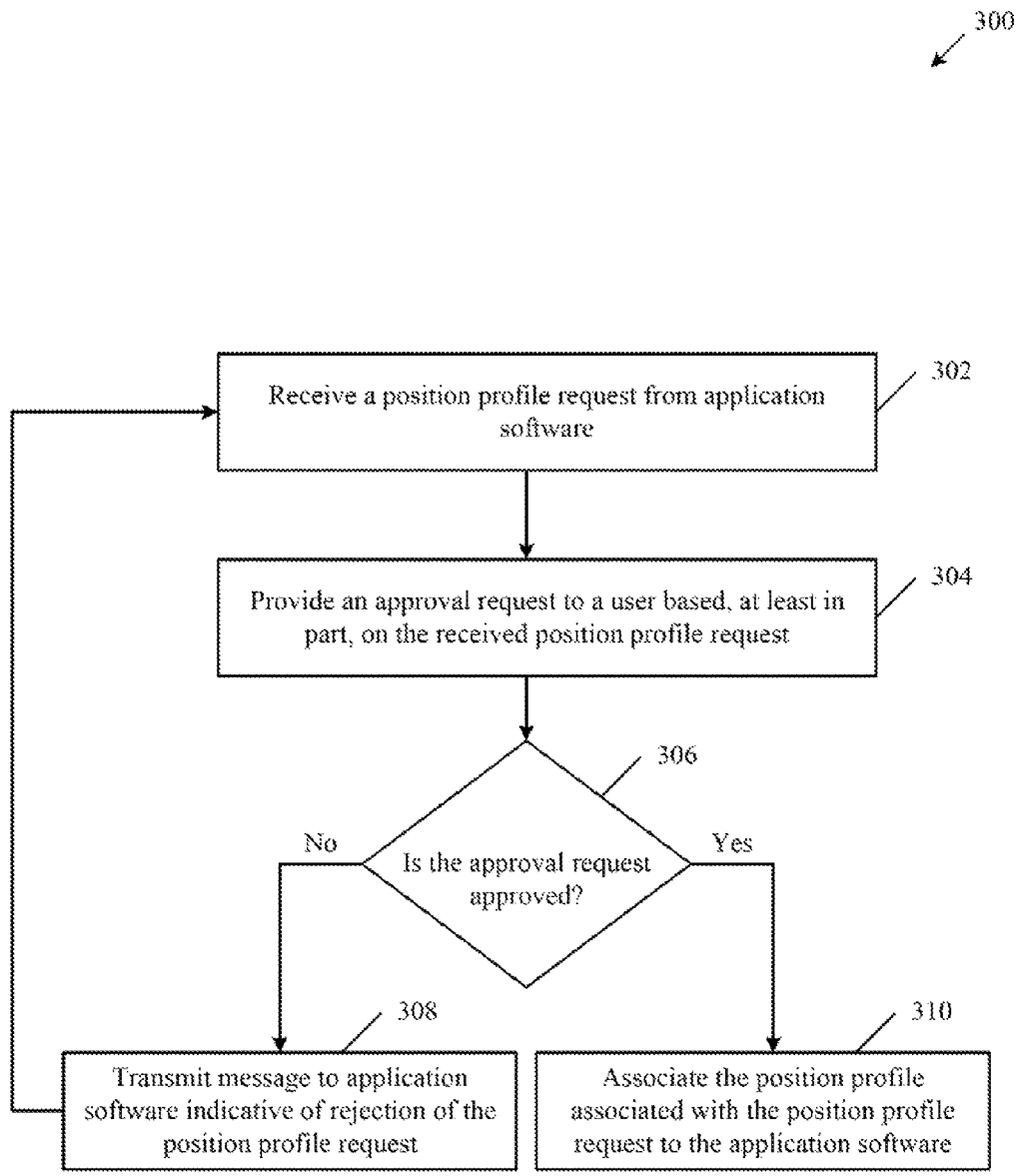
FIG. 3 is a flow diagram illustrating an example method for associating a position profile with an application software in accordance with illustrative embodiments of the disclosure.

Referring now to FIG. 3, an example method 300 for associating a position profile with an application software is described. This method 300, in certain embodiments, may be performed by the application framework 206 of the electronic system 111. In certain other embodiments, the operating system 208 or the position engine 210 may perform this method 300. In yet other embodiments, the method 300 may be performed by any or all of the application framework 206, the operating system 208, and/or the position engine 210. In certain aspects, the processes described herein may be performed by the one or more processors 112 by executing one or more instructions and/or applications stored on the memory 116.

At block 302, a requested position profile may be received from the application software. In one aspect, the application software 204 may generate the requested position profile and transmit the requested position profile to the application framework 206 and/or the operating system 208. Therefore, in certain embodiments, the requested position profile may be received by the application framework 206 from the operating system 208, or otherwise, indirectly from the application software 204. The application software 204 may generate the requested position profile and transmit the requested position profile when the application software 204 is installed on the electronic system 111, is first used, and/or first requests position information from the application framework 206 and/or the operating system 208.

The requested position profile from the application software 204 may be based on the position precision, granularity, and/or accuracy requirements of the application software 204. The requested position profile may further be based on a predetermined set of position profiles. In certain aspects, the predefined set of position profiles may be based on industry and/or consortia standards. In other aspects, the position profiles may be unique to a particular operating system and/or application framework. In yet other aspects, the application software 204 may be informed of the various available position profiles prior to the application software 204 making the position profile request. For example, a particular operating system 208 may inform the application software of the various position profile levels available when the application software 204 is installed on the electronic system 111.

In certain aspects, the application software 204 may perform at various levels of performance and/or granularity based upon the position profile associated with that application software 204. Therefore, in certain cases, the application software 204 may request a position profile that may provide more precise positional information than what is required for operation of the application software 204 at a less granular and/or different performance mode.

In certain embodiments, the application software 204 may request a position profile that may provide positional information that is numerical. In other words, the position profile may correspond to a positional information providing positional coordinates, such as latitude and longitude or (X, Y), that is associated with position information generated by the position engine 210. In certain other embodiments, the application software 204 may request a position profile that may provide non-numerical positional information. In other words, the position profile may correspond to positional information providing geographic information, such as a street, neighborhood, city, state, country, continent, zip code, or the like. In yet other embodiments, the application software 204 may request both a position profile that may provide positional information that is numerical and a position profile that may provide positional information that is geographic.

At block 304, a position profile request approval may be provided to a user of the electronic system. The position profile request approval may be provided to solicit a response from the user of the electronic system 111 on whether the requesting application software 204 may be accorded the requested position profile. The user and/or the owner of the electronic system 111 may consider his/her security needs and precision needs with respect to the requesting application when making a decision on whether to approve the position profile request. In other words, the user may consider what precision he/she would like the requesting application software 204, and/or any other entities with which the requesting application software 204 may share positional information, to know his/her position.

In certain aspects, the user may be presented with the decision to choose to approve or disapprove the position profile request on the user interface and/or I/O interface 202 of the electronic system 111. For example, the user may be presented with information associated with the requesting application software 204, such as the name and/or function of the application software 204, as well as the requested position profile information, such as the precision to which positional information will be provided to the application software 204.

Based at least in part on this and/or other information, the user may make a decision to approve or disapprove the requested position profile. The approval and/or disapproval of the requested position profile may be received via the user interface and/or I/O interface 202. In certain embodiments, to provide for additional security, the approval or disapproval of the requested position profile may be conducted only via communications that does not involve the electronic system 111. In other words, the approval may be solicited via other communications channels associated with the user of the electronic system 111, such as electronic mail (email) or by accessing a website. It will be appreciated that by requiring approval of the requested position profile from a device other than the electronic system Ill, additional security may be implemented and may prevent, for example, application software 204 installation and position profile allocation without the user's knowledge.

It will be appreciated that in certain embodiments, the user may have standing or predetermined instructions provided to the application framework 206 and/or the operating system 208 that may enable the application framework 206 and/or the operating system 208 to approve or reject the requested position profile approval on behalf of the user. In this case, the user may use or set a profile setting or may have a default profile setting that may indicate the user's preferences with regards to position profiles associated with application software 204. Accordingly, the operating system 208 and/or the application framework 206 may approve or reject the requested position profile based at least in part on the user's preference as established via one or more profile settings.

At block 306, it may be determined if the request approval has been approved. In other words, information representative of whether the user has decided to approve the requested position profile may be received by the application framework 206, either directly or via the operating system 208 and/or other entities. If the request approval is not approved at block 306, then at block 308, a message may be transmitted to the application software 204 indicating that the requested position profile has been rejected. At that point, the method 300 may return to block 302, where the application software 204 may provide a new requested position profile for approval by the user. Alternatively, in certain embodiments, the user may be presented with a choice of position profiles that may be associated with the requesting application software 204. In this case, the user may select a position profile to associate with the application software 204, and the application framework 206 may associate the application software 204 with the user selected position profile.

If at block 306 it is determined that the requested position profile has been accepted, then at block 310, the requested position profile may be associated with the application software. The association may be in the form of a database or a table stored in the memory 116 and accessible by one or more of the application framework 206, the operating system 208, and/or other elements of the electronic system 111.

Figure 4:
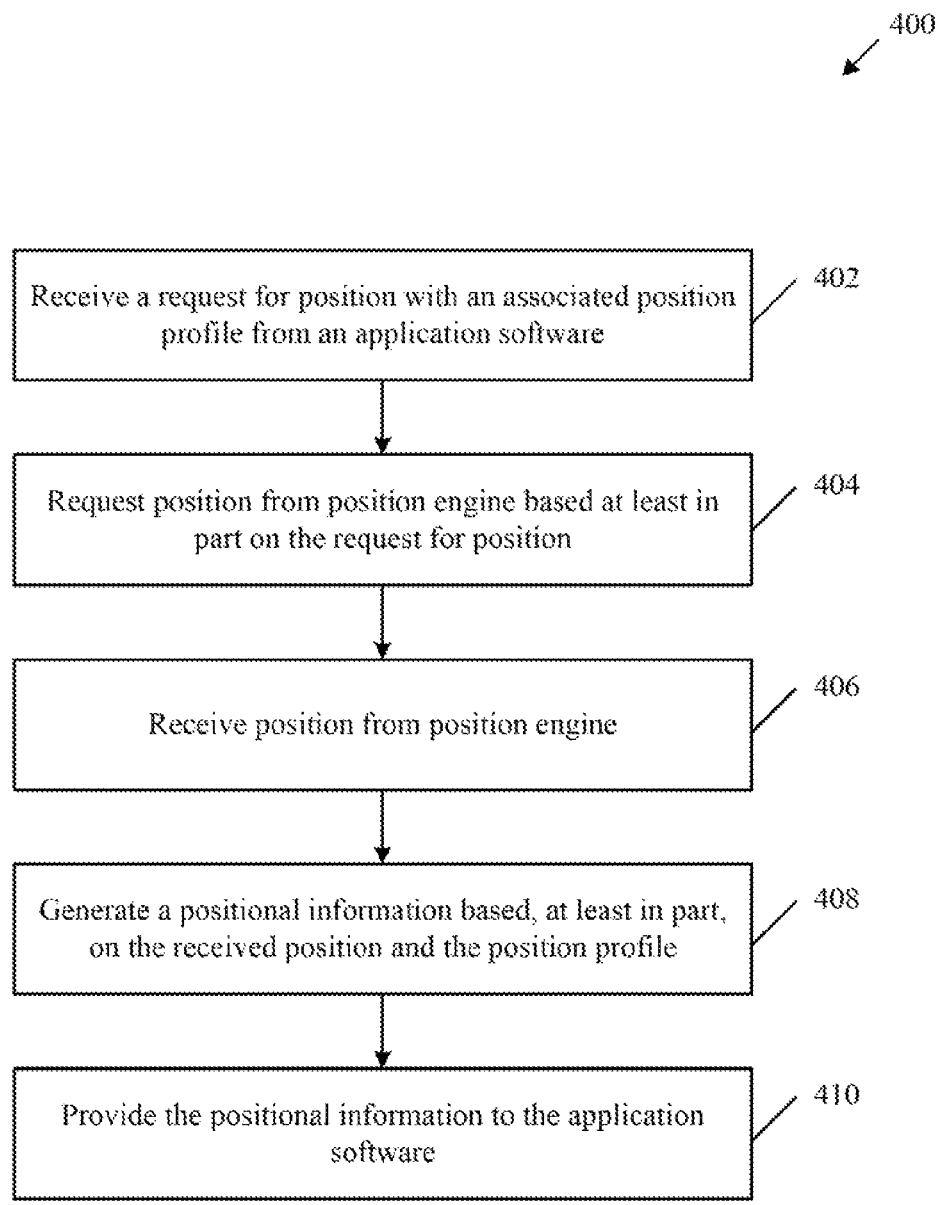
FIG. 4 is a flow diagram illustrating an example method of operating the position system of FIGS. 1 and 2 with variable precision position in accordance with illustrative embodiments of the disclosure.

Referring now to FIG. 4, an example method 400 for providing positional information to an application software 204 is illustrated. The method 400, in certain embodiments, may be performed by the application framework 206. In other embodiments, the method 400 may be performed by a combination of the application framework 206 and the operating system 208.

At block 402, a request for position with an associated position profile may be received. The request may be received from an application software 204. The request for position may be in the form of one or more data packets indicating the application software 204 that is requesting the position information. The one or more data packets may also include an indication of the position profile with which the application software 204 is associated. In other embodiments, the request for position may not include an associated position profile. Instead, the application framework 206 and/or the operating system 208 may access the database or table of position profile association to determine the position profile associated with the position requesting application software 204. Regardless of the particular contents of the request for position, the application framework 206 receives and/or determines an indication that the application software 204 requests positional information and the position profile associated with the application software 204.

At block 404, responsive to the request for position, position information may be requested from the position engine 210. In one aspect, the application framework 206 may transmit a message to the position engine 210 to provide the current position of the electronic system 111. The message may be in the form of one or more data packets. At block 406, responsive to the requested position, the application framework 206 may receive position information from the position engine 210. The received position information may be at or near the precision and/or accuracy limits of the position system 110 of the electronic system 111. In other words, the position engine 210 may always provide position information at a relatively high level of precision. Furthermore, the position engine 210 may provide position information without reducing the precision of that position information. In other embodiments, the position engine 210 may provide position information that is not at or near the precision limits of the electronic system.

At block 408, positional information may be generated based at least in part on the received position and the position profile. The application framework 206 may determine, based on the position profile, the level of precision of the positional information to be provided to the application software 204. The application framework 206 may then mathematically manipulate the position information received from the position engine to generate an appropriate positional information. For example, if the positional profile of the requesting application software 204 corresponds to +/−100 m, then the application framework 206 may add a spatial offset to the position information received from the position engine 210 to reduce the precision of the positional information provided to the application software 204. However, the precision may be degraded by, at most, 100 m, in accordance with the position profile of the application software 204.

As discussed above, the spatial offset provided to diminish the precision of the positional information may be held constant over a predetermined period of time. This may be done to reduce the possibility of a particular application software 204 making multiple requests for position and, based on a larger set of positional data, determining the position of the electronic system 111 to a precision level that is more precise than what individual positional information provided to that application software 204 would allow. If, for example, the spatial offset was randomly generated each time a position was requested, then simply performing a spatial averaging of multiple positional information may provide a greater precision than possible from just one positional information. By making, the spatial offset unchanging, at least for the span of a predetermined period of time, such as 3 hours, performing mathematical operations and/or algorithms to acquire greater levels of precision may be difficult and/or prevented.

In certain embodiments, the application framework 206 may determine positional information in the form of geographic information to provide to the application software 204. In this case, the application framework 206 may use numeric coordinates of the position received from the position engine 210 to determine geographic position information. In one aspect, the geographic position information may be determined by accessing a database and/or a look-up table that maps positional coordinates to geographic information. The geographic precision may be set according to the position profile. For example, the position profile may indicate if country, state, county, and/or city level data should be returned by the application framework 206 to the application software 204.

At block 410, the positional information may be transmitted to the application software 204. Therefore, the application software 204 receives positional information with a position precision according to the position profile associated with the application software 204. As a result, the highest level of position precision may not be provided to the application software 204.

It will be appreciated that with method 300 of FIG. 3 and method 400 of FIG. 4, the user of the electronic system 111 may have the ability to control the precision to which application software 204 is operating on the electronic system 111, and the entities with which they communicate may know the location of the electronic system 111. Indeed, this may allow users to control the level to which third parties may know their current positions. At the same time, the users may be able to use position-aware application software 204 on their electronic systems 111.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device, or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
    receiving, by one or more processors, a request for position associated with an application running on a user device;
    identifying, by the one or more processors, a position profile associated with the application;
    requesting, by the one or more processors and based at least in part on the request for position, a position information;
    receiving, by the one or more processors and based at least in part on the requesting, the position information;
    determining, by the one or more processors and based at least in part on the position information and the position profile, a new position information; and
    providing, by the one or more processors, the new position information to the application based at least in part on the received position information and the position profile.

2. The method of claim 1, wherein the received request for position comprises the position profile.

3. The method of claim 1, wherein identifying the position profile comprises accessing a database of position profiles.

4. The method of claim 1, wherein the position profile identifies at least one of: (i) a precision with which new position information is provided to the application; (ii) a precision associated with numerical coordinate positional information; or (iii) a precision associated with geographic positional information.

5. The method of claim 4, wherein the geographic positional information comprises information identifying position by at least one of: (i) address; (ii) street; (iii) neighborhood; (iv) block; (v) zip code; (vi) city; (vii) area code; (viii) county; (ix) state; (x) country; or (xi) continent.

6. The method of claim 1, wherein the position information comprises position at a first precision level and the new position information comprises position at a second precision level, wherein the second precision level is less precise than the first precision level.

7. The method of claim 1, wherein determining the new position information comprises adding a spatial offset to the position information.

8. The method of claim 7, wherein the spatial offset is fixed during a predetermined span of time.

9. An position system comprising:
- an application software running on a user device associated with a position profile and configured to generate a position request to receive position information at a first precision level;
- an application framework configured to receive the position request and generate position information at a first precision level based at least in part on position information at a second precision level and the position profile; and
- a position engine configured to provide position information at the second precision level based at least in part on one or more positional signals.

10. The position system of claim 9, wherein the application software is further configured to provide a position profile request associated with the position profile to the application framework.

11. The position system of claim 10, wherein the application framework is further configured to associate the position profile with the application software based at least in part on an approval of the position profile request.

12. The position system of claim 9, wherein the second precision level is more precise than the first precision level.

13. The position system of claim 9, wherein the position information at the second precision level comprises at least one of: (i) numerical coordinate positional information; or (ii) geographic positional information.

14. The position system of claim 9, wherein the one or more positional signals comprise at least one of: (i) one or more global navigation satellite signals (GNSS); (ii) one or more wireless fidelity (Wi-Fi) access point signals; or (iii) one or more inertial sensor signals.

15. At least one computer-readable medium comprising computer-executable instructions that, when executed by one or more processors, executes a method comprising:
- receiving a request for position associated with an application running on a user device;
- requesting based at least in part on the request for position, a position information based on a position profile associated with the application;
- receiving based at least in part on the requesting, the position information;
- determining based at least in part on the position information and the request for position, a new position information; and
- providing the new position information to the application based at least in part on the received position information and the position profile.

16. The computer-readable medium of claim 15, wherein the method further comprises receiving a position profile request associated with the position profile from the application.

17. The computer-readable medium of claim 16, wherein the method further comprises receiving an indication of the approval of the position profile request.

18. The computer-readable medium of claim 17, wherein the method further comprises associating the position profile with the application software based at least in part on the approval of the position profile request.

19. The computer-readable medium of claim 15, wherein the new position information is at least one of: (i) numerical coordinate positional information; or (ii) geographic positional information.

20. The computer-readable medium of claim 15, wherein determining the new position information comprises adding a spatial offset to the position information.

21. The computer-readable medium of claim 20, wherein the spatial offset is fixed during a predetermined span of time.

22. The computer-readable medium of claim 15, wherein determining the new position information comprises identifying a position profile associated with the application.

23. An electronic system comprising:
- one or more antennas configured to receive one or more positional signals;
- at least one processor communicatively coupled to a memory and configured to execute one or more instructions on the memory to:
  - determine position information of a user device at a first precision level based at least in part on the one or more positional signals;
  - generate position information at a second precision level based at least in part on position information at the first precision level and a position profile; and
  - provide the position information at the second precision level to an application software associated with the position profile based at least on the received position information and the position profile.

24. The electronic system of claim 23, wherein the at least one processor is further configured to receive a position profile request associated with the position profile from the application software.

25. The electronic system of claim 24, further comprising one or more user interfaces configured to receive an indication of an approval of the position profile request.

26. The electronic system of claim 25, wherein the at least one processor is further configured to associate the position profile with the application software based at least in part on the approval of the position profile request.

27. The electronic system of claim 23, wherein the first precision level is more precise than the second precision level.

28. The electronic system of claim 23, wherein the position information at the first precision level comprises at least one of: (i) numerical coordinate positional information; or (ii) geographic positional information.

* * * * *